Nov. 12, 1929.  M. P. WETMORE  1,735,027
APPARATUS FOR PRODUCING DOUBLE-WALLED GLASS CONTAINERS
Filed March 8, 1927  6 Sheets-Sheet 1

Nov. 12, 1929.  M. P. WETMORE  1,735,027
APPARATUS FOR PRODUCING DOUBLE WALLED GLASS CONTAINERS
Filed March 8, 1927  6 Sheets-Sheet 3

INVENTOR
MINER P. WETMORE
BY
Adolph A. Thomas
ATTORNEY

Nov. 12, 1929.  M. P. WETMORE  1,735,027
APPARATUS FOR PRODUCING DOUBLE WALLED GLASS CONTAINERS
Filed March 8, 1927
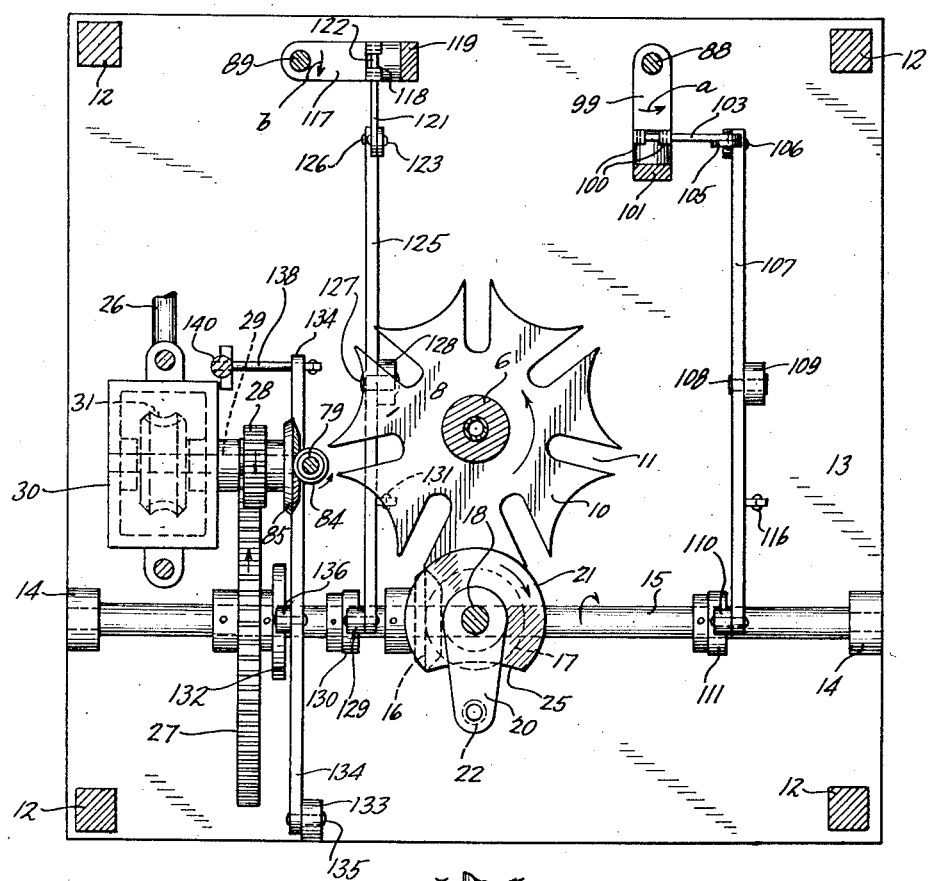
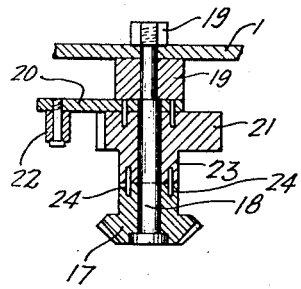
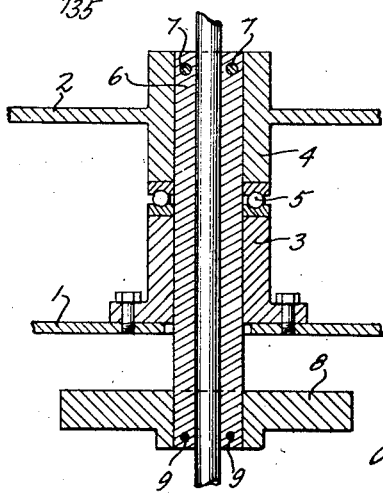
INVENTOR
MINER P. WETMORE

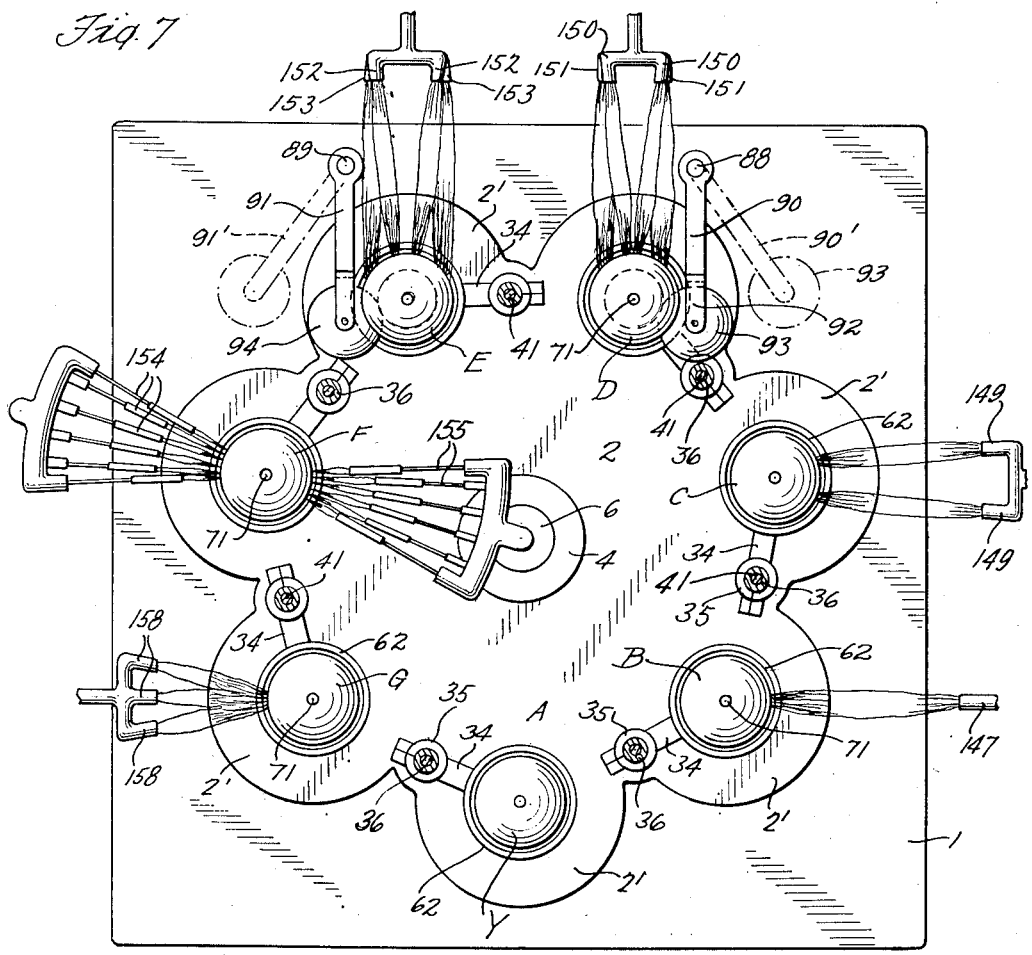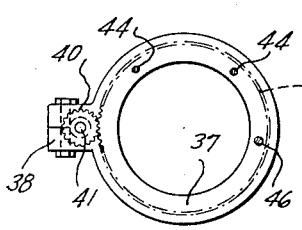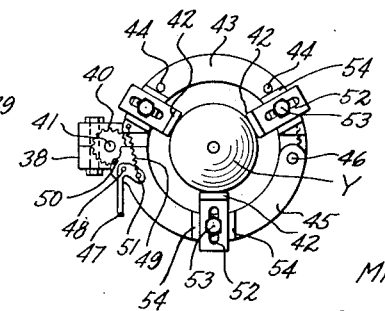

Nov. 12, 1929.  M. P. WETMORE  1,735,027
APPARATUS FOR PRODUCING DOUBLE WALLED GLASS CONTAINERS
Filed March 8, 1927   6 Sheets-Sheet 6
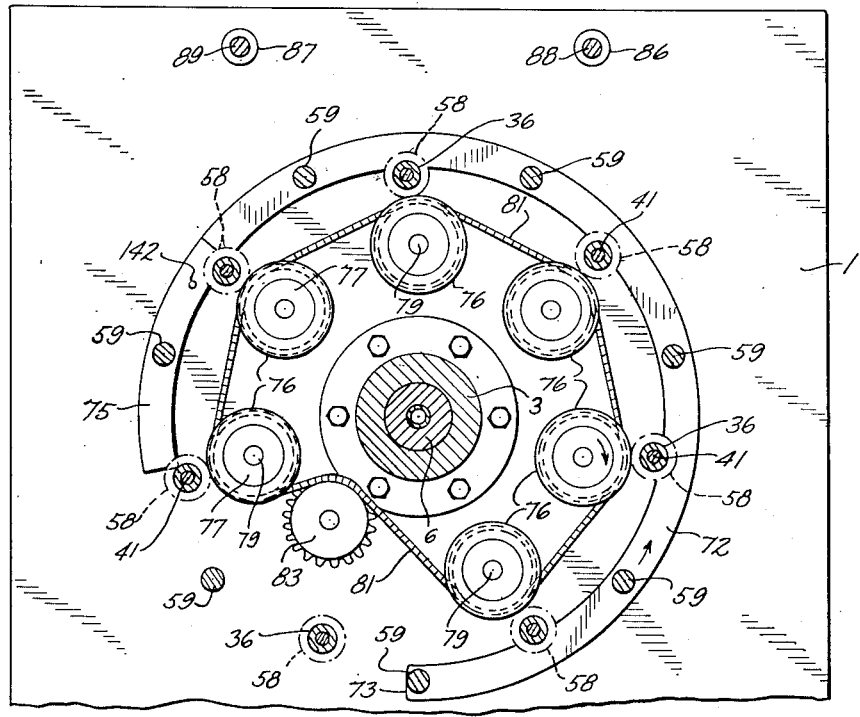
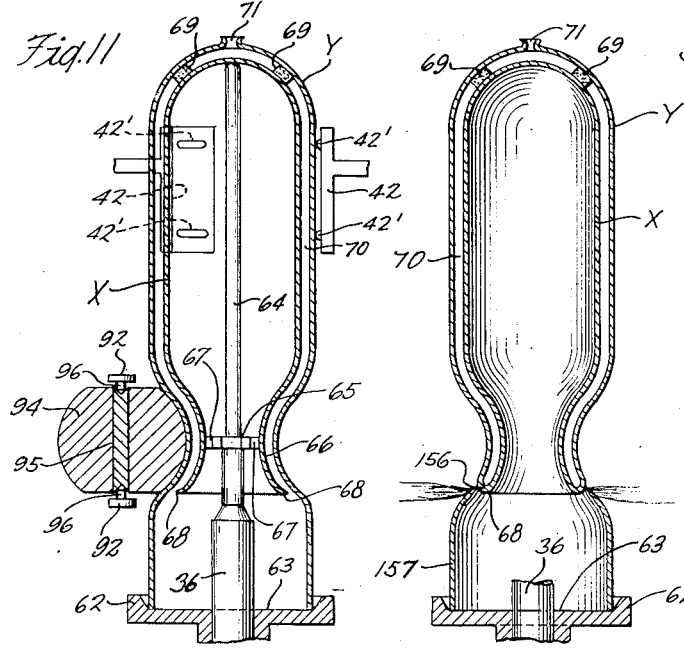
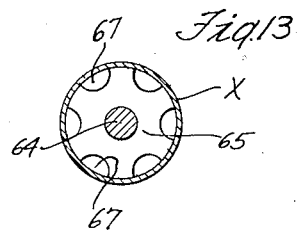
INVENTOR
MINEP P. WETMORE
BY
Adolph A. Thomas
ATTORNEY Patented Nov. 12, 1929

1,735,027

UNITED STATES PATENT OFFICE

MINER P. WETMORE, OF NORWICH, CONNECTICUT, ASSIGNOR TO THE AMERICAN THERMOS BOTTLE COMPANY, OF NORWICH, CONNECTICUT, A CORPORATION OF OHIO

APPARATUS FOR PRODUCING DOUBLE-WALLED GLASS CONTAINERS

Application filed March 8, 1927. Serial No. 173,655.

My invention relates to the manufacture of heat-insulated receptacles of the so-called vacuum type, in which there is an inner container consisting of two concentric glass cylinders united at the top and separated by a vacuum chamber. It is the object of my invention to provide improved means and methods for sealing the glass cylinders at the neck so as to produce double-walled containers at less cost and without the difficulties existing in prior methods of manufacture.

It is well known that the double-walled glass containers of vacuum bottles have a cylindrical body with a contracted neck. In the completed filler, as this form of container is usually called, the two cylinders or pistons are fused together at the neck. Since the body of the inner cylinder has a greater diameter than the neck of the outer cylinder, it has heretofore been necessary to bring the two cylinders into concentric relation by the following procedure: The base or bottom part of the outer cylinder is cut off by the application of heat, the inner cylinder is then inserted through the open bottom of the outer cylinder and held spaced by asbestos pads, the two cylinders are sealed at the neck by fusing the glass, and finally the cut-off portion of the outer cylinder is fused in place again. This method of forming glass fillers has been in use, as far as I know, for about twenty years, and it has always constituted one of the great difficulties and objections in the manufacture of vacuum bottles. Manifestly, the breaking of the outer cylinder for the insertion of the inner cylinder and the subsequent replacing of the broken off portion, were steps that added materially to the cost of production.

To overcome the foregoing and other objections and disadvantages in the manufacture of vacuum bottles, I provide a novel method and apparatus for assembling the two containers in inverted position and sealing the inverted containers at the neck. Briefly stated, I proceed substantially as follows: An inner cylinder with contracted neck is firmly supported in inverted position on a vertical rod. An outer cylinder of substantially uniform diameter (that is, with its mouth uncontracted) is then placed over the inner cylinder and held properly spaced therefrom in concentric relation. While the inverted cylinders are rotated as a unit, heat is applied to the outer cylinder in a zone opposite the neck of the inner cylinder. This heat is gradually increased until the glass of the outer cylinder is sufficiently plastic for the operation of a shaping device which forms a contracted neck on the outer cylinder corresponding to the neck on the inner cylinder. Sharp jet flames of intense heat force the fluent glass of the outer neck into sealing contact with the edge of the inner neck, while at the same time the surplus glass on the outer cylinder is automatically cut off by the action of the flames and dropped down out of the way. The sealed edge at the neck of the cylinders is then smoothed off by means of properly directed jets of flame, and the operation of uniting the two cylinders into a double-walled unit is complete. The filler is now ready for the silvering and evacuating operations.

The neck-sealing apparatus of my invention supports a plurality of pairs of cylinders and is automatic in its operation from the moment a pair of separate cylinders are inserted until the sealed cylinders are removed as a unit. As will be clear later on, the operation of the machine is continuous, requiring only the feeding of cylinders and the removal of the formed fillers.

So that those who are skilled in this art may fully understand my invention and practice the same, I shall described in detail the construction of a machine which I have actually employed in the practical application of my invention. This machine is shown in the accompanying drawings, in which—

Fig. 4 shows a plan view on line 4—4 of Fig. 1;

Figs. 5 and 6 are fragmentary sectional view showing certain driving connections for the rotary frame on which the inverted cylinders are mounted;

Fig. 7 represents a top plan view of the machine, with certain parts omitted for clearness, showing the circular arrangement of the inverted cylinders, and the various operations to which they are subjected in their intermittent travel;

Fig. 8 is a plan view of certain driving connections for the bottle-holding mechanism;

Fig. 9 is a view similar to Fig. 7, showing a chuck holding an outer cylinder;

Fig. 10 is a cross-section approximately on line 9—9 of Fig. 1, showing the circular cam-track and the driving connections for rotating the inverted cylinders about their own axes;

Fig. 11 shows how the neck of the outer cylinder is shaped;

Fig. 12 shows how the two inverted cylinders are sealed together at the neck, the surplus glass being at the point of dropping off; and Fig. 13 is a fragmentary plan view showing the centering collar for the neck of the inner cylinder.

Figure 1:
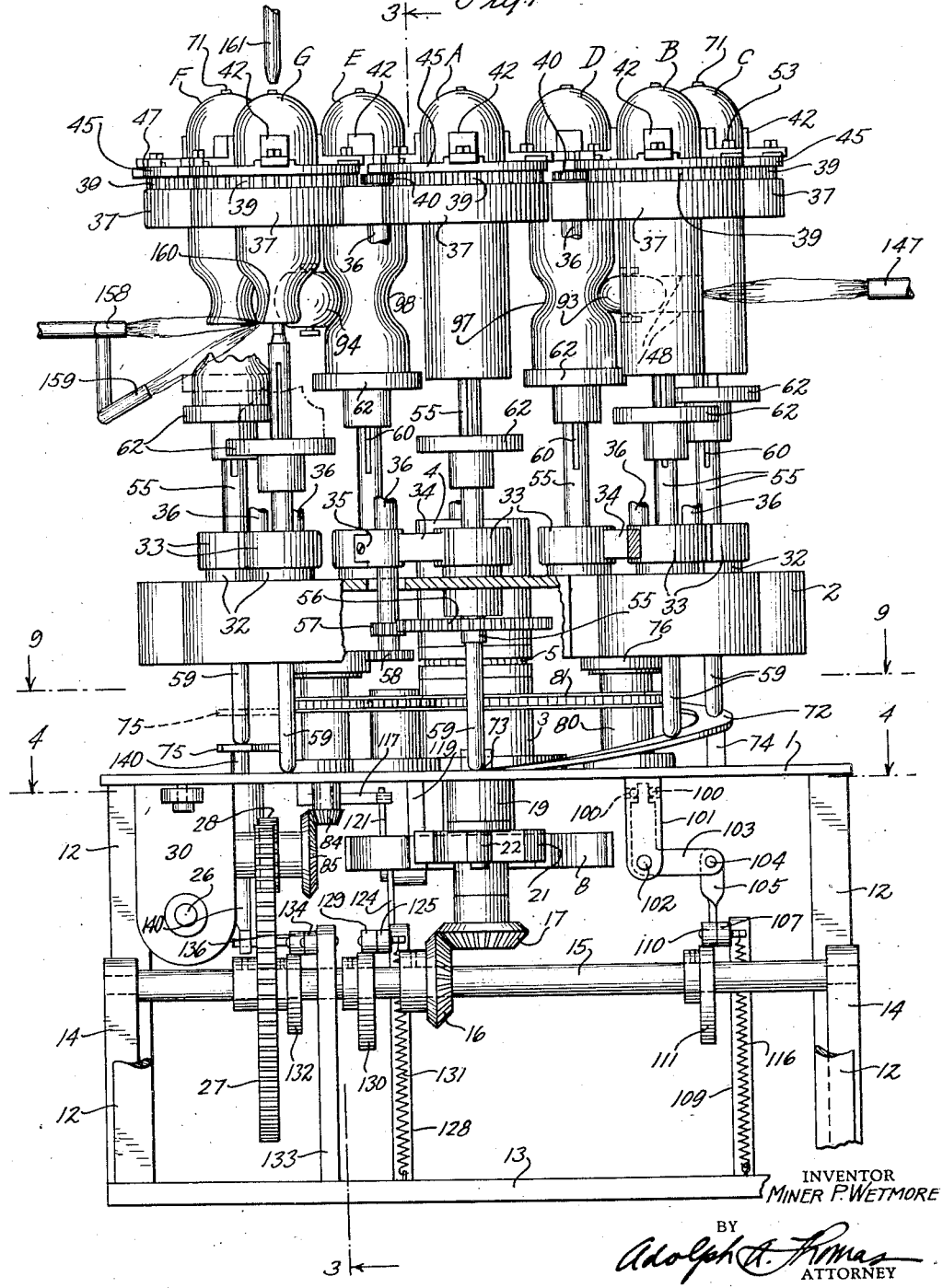
Fig. 1 represents a front elevational view of a neck-sealing machine constructed in accordance with my invention, some driving connections being omitted to prevent confusion.

On a table 1 is mounted a horizontal frame or spider 2 adapted to turn intermittently at predetermined intervals, as will be later explained more fully. A bearing member 3 (see Fig. 5) is fixed on the table for supporting the central hub 4 of frame 2. Roller bearings 5 are preferably interposed between members 3 and 4. A sleeve 6 is secured to hub 4 by pins 7, or otherwise, and this sleeve extends through bearing 3 below the table. To the lower end of sleeve 6 is fixed a Geneva gear 8, as by means of pins 9 or in any other practical way. The form of Geneva gear 8 is shown in Fig. 4. In the present machine, which is to be regarded as a practical example of my invention and not as a limitation thereof, the frame or turntable 2 has seven intermittent movements in one revolution, and so the Geneva gear 8 has seven teeth 10 separated by as many operating slots 11. The table 1 is supported on posts 12 extending upwardly from a base 13. A pair of aligned standards 14 secured on base 13 carry a rotary driving shaft 15 on which is fixed a bevel gear 16 arranged to mesh with a bevel gear 17, as may be seen in Fig. 1. The bevel gear 17 is rotatably mounted on the lower end of a vertical stud 18 (see Fig. 6) rigidly secured to the table by nuts 19 or otherwise. An actuating arm 20 and Geneva stop 21 are rotatably mounted as a single member on stud 18. The arm 20 carries at its free end a roller 22 arranged to engage in slots 11 to actuate the Geneva gear 8 intermittently the distance of one tooth, as will be clear by looking at Fig. 4. The parts 20 and 21 are either secured together or cast as a single piece. A hub or extension 23, which may be formed integral with stop 21, is secured by pins 24 to bevel gear 17 (see Fig. 6). Any other practical means may be used for operatively connecting gear 17 to the rotary parts 20 and 21. As is usual in Geneva gear movements, the stop member 21 is so arranged with respect to the actuating arm 20 that the cut-away segment 26 allows movement of wheel 8 every time the roller 22 engages a slot 11. During the intervening periods, the Geneva wheel 8 is positively locked against rotation by stop 21. It will be now understood that, for every revolution of driving shaft 15, the frame or turntable 2 receives one-seventh of a revolution. In the present instance, the shaft 15 is operated at such speed that the actuating arm 20 makes one revolution in twenty seconds, or three revolutions every minute. Accordingly, the Geneva wheel 8 and therefore the rotary frame 2, receives one kick (which here equals one-seventh of a revolution) every twenty seconds.

The driving shaft 15 is operated from a suitable power shaft 26 through the following connections: On shaft 15 is fixed a large gear 27 meshing with a pinion 28 on a rotary countershaft 29 (see Fig. 4), which is mounted in a gear casing 30 depending from the table 1. The casing 30 contains a suitable worm-gear arrangement (diagrammatically indicated by dotted lines 31 in Fig. 4) for reducing the speed of the power shaft 26 to the desired point. The power shaft 26 may be driven from any suitable source of power, which will usually be an electric motor. Perhaps I ought to explain here, in reference to the drawings, that whenever I show meshing gears I represent the gears as being slightly out of alignment—see, for instance, gears 27 and 28 in Figs. 1 and 4. This is done merely to promote clearness in the illustrations.

Figure 2:
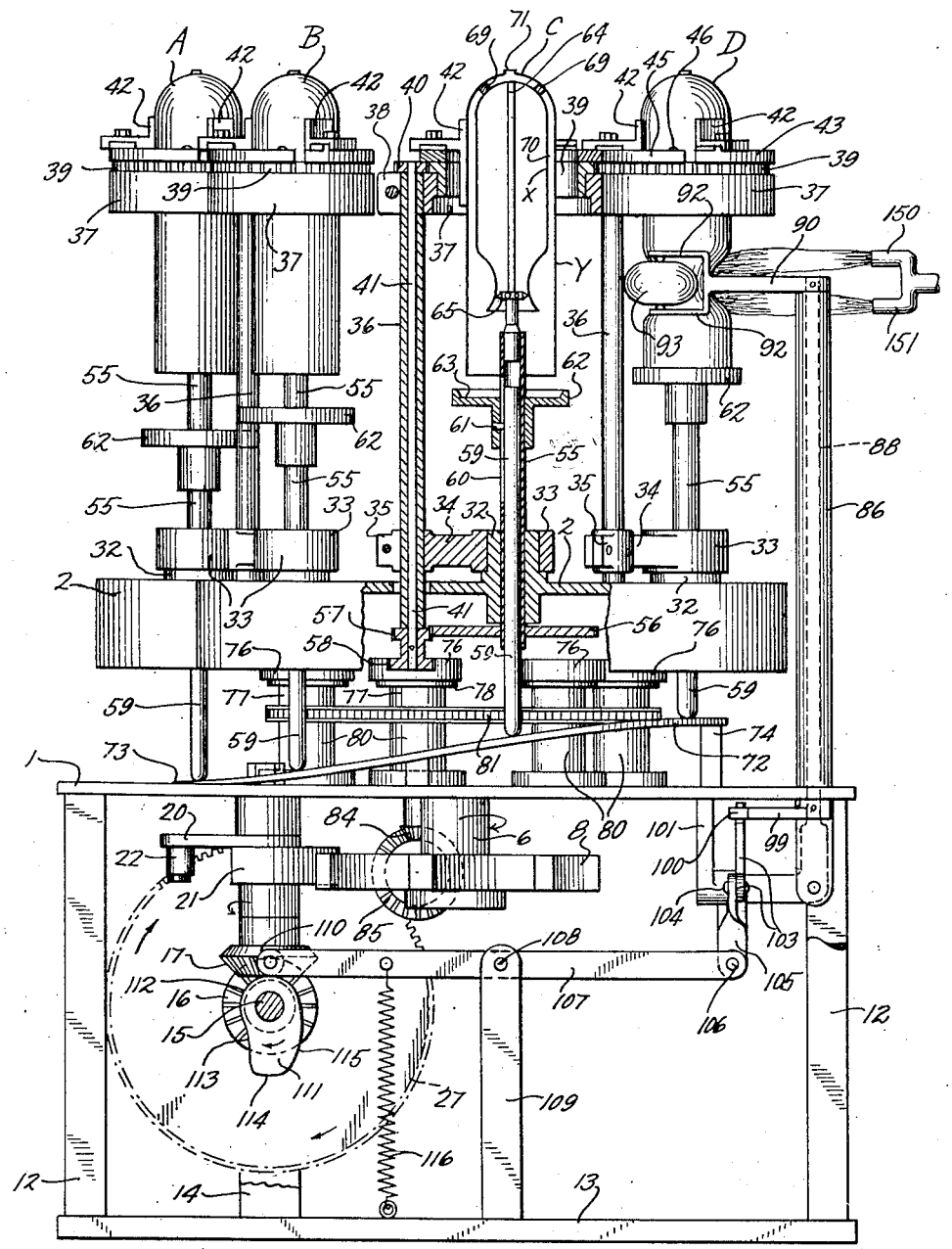
Fig. 2 is a side view of the machine, with certain parts in section for clearness.

Having now described how the rotary frame 2 is intermittently operated from the continuously rotating power shaft 26, let us turn our attention to the mechanism carried by the frame and movable therewith. The frame 2 is provided with a series of circularly arranged hubs 32, of which there are seven in the present embodiment. As seen in Fig. 2, these hubs constitute upright bearing sleeves extending above and below the table top of the frame. The equidistant spacing of the hubs in a circular path will be understood from the plan view of Fig. 7, which shows the frame 2 formed with seven circular or disk-like projections 2' in the center of which the hubs 32 are arranged. This particular construction, however, is merely a mechanical convenience and not an essential feature of my invention. On the upper part of each hub 32 is rigidly mounted a sleeve or ring 33 provided with an arm 34 which terminates in a split bearing 35 adapted to support a tube 36 in rigid vertical position. To the upper end of tube 36 is clamped a ring 37 by means of a split bearing 38, or in any other practical way. On each ring 37 is rotatably mounted a gear 39. Fig. 2 clearly shows how the gear 39 is firmly seated on ring 37 for rotary movement. The gear 39 receives rotary motion from a pinion 40 fixed on the upper end of a spindle 41 rotatably supported in tubing 36. The function of gear 39 is to support a chuck adapted to hold a glass cylinder clamped in inverted position, as will more fully appear later on. In the particular construction herein illustrated, the chuck comprises three holding members 42 arranged radially at equal distances (see Fig. 9). Two of these holding members are mounted on a ring section 43 fastened to the top of gear 39 by pins 44 or otherwise. The third holding member 42 is mounted on a ring section 45 pivoted to the top of gear 39 by a pin 46. On ring section 45 is pivoted a bellcrank 47 on a pin 48. A contracting spring 49 is connected at one end to the fixed ring section 43, and at the other end to the bellcrank 47. When the parts are in the position shown in Fig. 9, the spring 49 is loose and the ring section 45 is free to move outwardly when the outer glass cylinder Y is inserted. After the cylinder is in proper position, the arm 47 is thrown toward the left (as viewed in Fig. 9) until it strikes a stop 50. This movement of arm 47 expands the spring 49, which is automatically held under tension by reason of the fact that the connecting point 51 of the spring now lies between the pivot 48 and stop 50. In other words, the arm 47 acts like a toggle which locks the spring in tensioned position to exert a constant inward pull on the ring section 45, whereby the chuck members 42 are firmly held in pressure contact with the inserted cylinder. The chuck members are radially adjustable by means of slots 52 and screws or bolts 53 carried by the ring sections 43 and 45. To hold the members 42 securely in radial position, they are mounted between retaining flanges 54 provided on ring sections 43 and 45. In practice I usually make the chuck members 42 of cast iron and attach asbestos cord or pads 42' to the inside surface for directly engaging the glass cylinder, as shown in Fig. 11. In this way the glass is held out of contact with the metal of the chuck.

Still referring to Fig. 2, each bearing hub 32 on frame 2 supports a sleeve 55, which is capable of rotation but has no vertical movement. To the lower end of sleeve 35 is fixed a gear 56 arranged to mesh with a pinion 57 rigidly mounted on the lower end of spindle 41. The pinion 57 is connected with a pinion 58. In practice the pinions 57 and 58 may be formed as a single member. The purpose of pinion 58 is to rotate the spindle 41, as will presently be explained. In the rotary sleeve 55 is mounted a vertically movable pin 59. The sleeve 55 is provided with an axial slot 60 in which rides a lug or dowel 61 carried by the pin 59. Because of this connection, the pin 59 always rotates with the supporting sleeve 55, but it is always free to move up and down in the sleeve. Each rod carries at its upper end a cup 62 formed with a circular recess 63 adapted to engage and support the bottom edge of the inverted outer cylinder Y. The lug 61 may be used to connect the cup 62 to pin 59. The cup 62 rotates in unison with the sleeve 55, but slides up and down the sleeve with the pin 59. When I refer to the member 62 as a cup, I use the term in its broadest possible sense to indicate any suitable supporting member for the bottom of the outer cylinder. In the top of rotary sleeve 55 is fixed a rod 64 adapted to support an inner cylinder X in inverted position. The supporting rod 64 is provided with a collar 65 arranged to engage the neck 66 of the inner cylinder X, whereby the latter is held against side movement. The centering collar 65 may simply be a metal disk cut away at 67 (see Fig. 13) to provide vents for the passage of hot air out of the inner cylinder during the heating operations that will later be described. The neck 66 of the inner cylinder X terminates in an outwardly flaring rim 68. To the rounded bottom portion of the inner cylinder are fastened asbestos pads 69 which may be cemented in position, as by sodium silicate or in any other practical way. The pads 69 support the outer cylinder Y in inverted position on the inner cylinder. The chuck members 42 cooperate with the asbestos pads to hold the outer cylinder in concentrically spaced relation to the inner cylinder, so that the two cylinders are separated by an annular chamber 70 of substantially uniform width. This chamber is afterwards evacuated, but I need not go into that, because my invention has nothing to do with that operation. As shown in Fig. 2, the outer cylinder Y is of substantially uniform diameter (except for the rounded base portion) and extends considerably below the neck of the inner cylinder X. The base of the outer cylinder has a small opening 71 which serves several purposes, as will be explained when I describe the operation of the machine.

Figure 3:
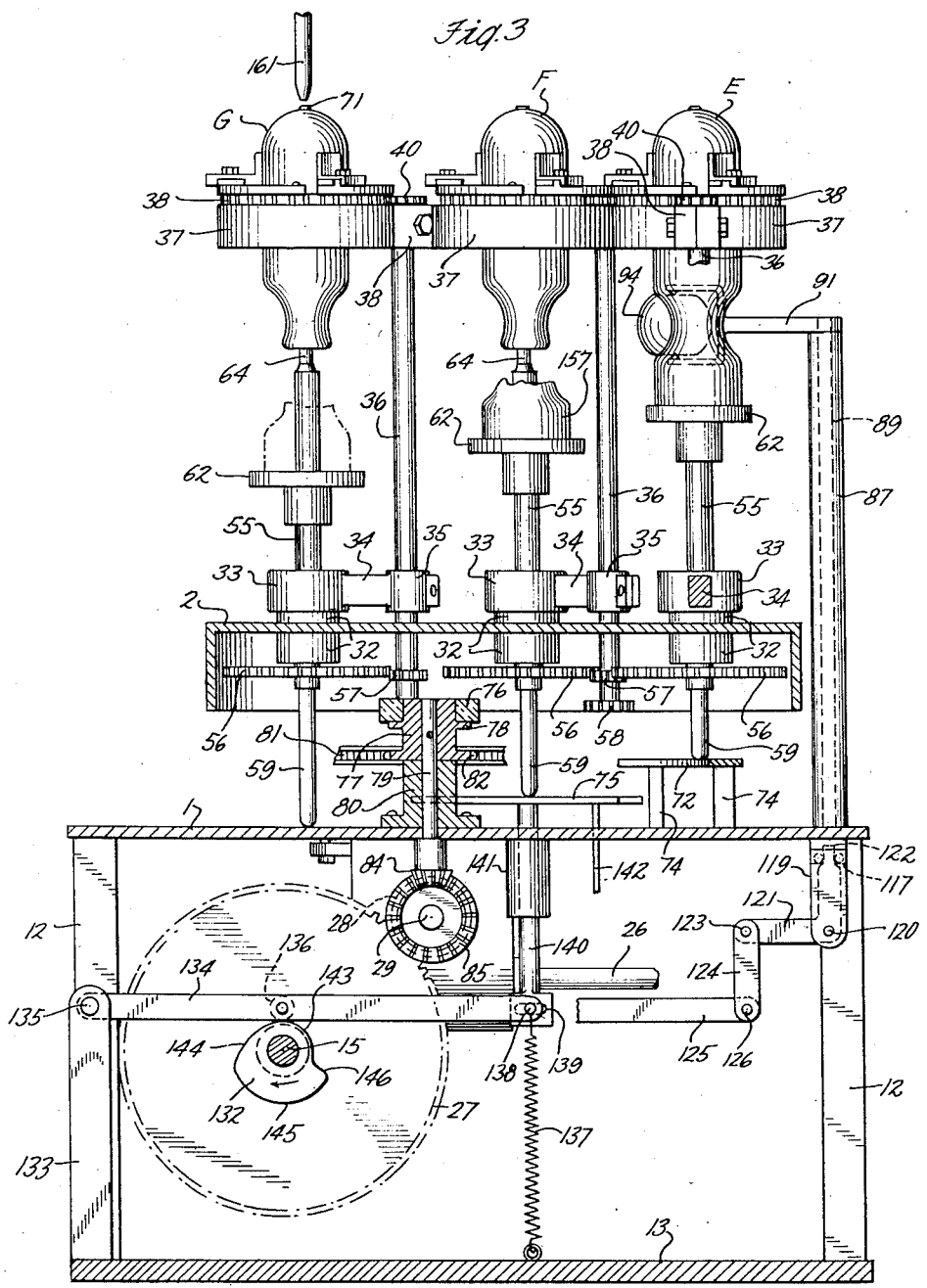
Fig. 3 is a transverse cross-sectional view approximately on the broken line 3—3 of Fig. 1.

The vertical movements of pins 59, and therefore of the supporting cups 62, are controlled by a cam-track 72 mounted on the table top 1. This cam-track rises gradually from the level of the table at 73 until it reaches its highest position before the two cylinders reach the first shaping roller, to which I shall presently refer in detail. When the pins 59 are on the highest portion of cam-track 72, the cups 62 are in supporting contact with the bottom of the outer cylinders. The cam-track 72 is mounted on posts 74. The end of cam-track 72 is in the form of a vertically movable section 75, which is suddenly dropped at a predetermined moment to carry away the surplus glass from the outer cylinder after the sealing operation. This function of the movable cam-track 75 will be more fully set forth when I describe the operation of the machine. The pinions 40 and 57 on the spindle 41 are of the same diameter and have the same number of teeth. The gear 56 on sleeve 55 is of the same size as the upper gear 39 on the fixed ring 37. Consequently, the sleeve 55 and chuck 42 rotate at exactly the same speed, so that the two inverted cylinders X and Y rotate about their common vertical axis as a unit. The speed of gears 39 and 56 is about fifty revolutions a minute. I give these figures by way of example and not as a limitation. The pinions 58, which are circularly arranged as shown in Fig. 10, derive their rotary movements from a series of friction wheels 76. These wheels may simply consist of rubber rings set into sprocket wheels 77, as best shown in Fig. 3, where it will be seen that the sprocket wheel is formed with an annular flange or shoulder 78 on which the friction driving ring is seated. The sprocket wheels 77 are secured to shafts 79, which are rotatably supported in bearing posts 80 mounted on table 1. A sprocket chain 81 engages the teeth 82 of the sprocket wheels, whereby the latter rotate simultaneously at the same speed, which in this case is about seventy revolutions a minute. An idler sprocket 83 holds the chain 81 taut and away from the front of the machine where the loading and unloading of the cylinders takes place. Referring to Fig. 3, it will be seen that the shaft 79 of one of the sprocket wheels 77 extends below the table top and carries a beveled pinion 84 arranged to mesh with a bevel gear 85 fixed on the counter-shaft 29, to which reference has previously been made. It will therefore be clear that the sprocket wheels 77 are driven from the common power shaft 26. The gears 58 are provided with fine teeth which bite into the rubber rings 76, so that a positive driving connection is established when those parts engage, and yet this connection is easily broken so as not to interfere with the intermittent rotary movements of frame 2.

I now come to the shaping mechanism and the connections for operating the same. At the back of table 1 are fixed two upright tubes 86 and 87 in which rods 88 and 89, respectively, are mounted for intermittent rotary movement. The upper end of rod 88 carries a forwardly extending arm 90, and the rod 89 is likewise provided with an arm 91. The arm 90 terminates in a pair of extensions 92, between which is supported a rotary shaping roller 93, as may be seen from Fig. 2. In a similar way the arm 91 supports a rotary shaping roller 94. These rollers are made of carbon, with a piece of metal tubing 95 inserted through the center, as best shown in Fig. 11. The supporting extensions 92 have bearing points 96 arranged to engage the opposite ends of tubing 95. By looking at Fig. 1, it will be seen that the rollers 93 and 94 are of different contour. The roller 93 is flatter than the other roller. The purpose of roller 93 is to give the outer cylinder Y a preliminary shape at the neck, as shown at 97 in Fig. 1, while the second roller 94 gives the outer cylinder its final shape 98.

The shaping roller 93 is moved into and out of shaping position by the following connections: To the lower end of rod 88 is fixed an arm 99 having a slotted end formed by a pair of pins or rollers 100 (see Figs. 1 and 2). A bracket 101 extending below the table 1 carries a pin 102 on which a bellcrank 103 is pivoted. The upper end of bellcrank 103 engages the slotted end of arm 99, so that movement of the bellcrank about its pivot rocks the arm 99 horizontally. The horizontal arm of bellcrank 103 is connected by a pin 104 to a twisted link 105, which is pivoted at 106 to the rear end of a lever 107. This lever is pivoted at 108 on a post or bracket 109 mounted on base 13. The forward end of lever 107 carries a roller 110 arranged to ride over a cam 111 fixed on the driving shaft 15 in correctly timed relation to the other moving parts of the machine. The shape of cam 111 is best shown in Fig. 2. As long as the roller 110 rides over the concentric or neutral portion 112 of the cam, there is no movement of the arm 90 on which the shaping roller 93 is mounted. When the roller rides over the rising portion 113 of cam 111, the rear end of lever 107 is depressed and the bellcrank 103 is rocked clockwise, as viewed in Fig. 1. This movement of bellcrank 103 rocks the pivoted arm 90 from the full-lined position shown in Fig. 7 to the dotted-lined position 90'. While the roller 110 travels down the cam section 115, the rear end of lever 107 is raised and the arm 90 moves from position 90' inwardly until it reaches the shaping position shown in Fig. 1. It will be clear that, as long as the wheel 110 travels over the concentric portion 112 of cam 111, the shaping roller 93 is held in operative position against the outer cylinder Y. A coil spring 116, connected at one end to the lever 107 and at the other end to the base 13, holds the cam roller 110 continuously pressed against the edge of the cam. The spring is of sufficient force to hold the carbon roller 93 in shaping contact with the plastic glass. It will be understood that the connections above described for operating the shaping roller 93 from the driving shaft 15 are to be regarded merely as illustrative of any practical system of driving connections.

The final shaping roller 94 is operated into and out of shaping position by the following connections, reference being had to Figs. 1, 3, 4 and 7. The lower end of rod 89 carries an arm 117 provided with a slotted end 118, similar to arm 99. From the table top 1 depends a bracket 119 having a pin 120 on which is pivoted a bellcrank 121. The upper end 122 of the bellcrank extends into the slot 118 of arm 117. The other end of bellcrank 121 is connected by a pin 123 to a link 124, which is connected to the rear end of lever 125 by a pin 126. The lever 125 is pivoted at 127 on a post 128 mounted on base 13. The front end of lever 126 carries a small wheel or roller 129 arranged to ride over a cam 130 fixed on the driving shaft 15. A coil spring 131 is connected at one end to the lever 126 and at the other end to the base 13 to hold the roller 129 constantly pressed against the edge. Since the two cams 111 and 130 are alike in construction and control their respective levers 107 and 125 in the same way for simultaneous operation, what has been said about the movements of lever 107 and arm 90 is fully applicable to the operation of lever 125 and the connected arm 91. I need not therefore repeat that portion of the description. The only difference in the operation of the arms 90 and 91 is that they simultaneously move in opposite directions. That is to say, when the arm 90 moves from shaping position into its inoperative position 90', as previously described, the arm 91 moves toward the left (as viewed in Fig. 7) into inoperative position 91'. The opposite movements of arms 90 and 91 are brought about by the relatively different arrangements of the lower arms 99 and 117, as will be clearly understood from Fig. 4. For instance, when the rear end of lever 107 is depressed, the arm 99 is rocked in the direction of arrow $a$. When the rear end of lever 125 moves down, the connected bellcrank 121 rocks the arm 117 forwardly as indicated by arrow $b$. The result is that the two arms 90 and 91 always move in opposite directions.

On the power shaft 15 is fixed a third cam 132 adjacent the gear wheel 27, as shown in Figs. 1, 3 and 4. On a post or bracket 133 at the front of the machine is pivoted a lever 134 at 135. Intermediate its ends the lever 134 carries a roller 136 arranged to ride over the cam 132. A coil spring 137 is connected to the rear end of lever 134 to force the roller 136 against the edge of the cam. The rear end of lever 134 carries a lateral pin 138 arranged to engage in a slot 139 provided in the lower end of a plunger rod 140 passing through a guide sleeve 141 which is secured to the underside of the table. The plunger rod 141 carries the movable cam-track 75, to which I have already referred. A pin 142, attached to the cam-track 75, passes through a hole in the table 1 to hold the cam-track against rotary movement. The shape of cam 132 is such that when the roller 136 rides over the concentric portion 143, the rear end of lever 134 is depressed and the cam-track 75 is in lowered position. As the roller 136 rides over the rising portion 144 of the cam, the track 75 is gradually lifted until the roller reaches the high section 145, which is concentric and holds the track in uppermost position in alignment with the stationary section of cam-track 72. It will be noticed from Fig. 3 that the high cam section 145 is connected to the low section 143 by a radial edge 146, which causes the track 75 to drop suddenly as the roller passes from cam edge 145 to cam edge 143.

There remains to be described the arrangement of gas jets or burners for directing flames of requisite heat against the outer cylinder. Referring to Figs. 1 and 7, there is a gas jet or burner 147 for directing a flame against the outer cylinder in an annular zone or region opposite the neck of the inner cylinder, as roughly indicated by dotted lines 148 in Fig. 1. The flame from jet 147 is the first heat imparted to the rotating cylinder, and this may be called the preliminary heating stage to prepare the glass for receiving increased heat from burners 149, which represent the second heating stage. The flames from burners 149 soften the glass, which begins to turn a dull red before being moved to the next position. Two pairs of burners 150 and 151 (see Figs. 2 and 7) are arranged to throw flames against the outer cylinder during the first shaping operation by roller 93. The upper burners 150 throw slightly converging flames, while the lower burners 151 throw flames which are substantially parallel, so that approximately one-half the circumference of the outer cylinder is covered by the flames. In the machine as actually used, the four burners 150 and 151 cover a zone about three-fourths of an inch wide on either side of the neck rim of the inner cylinder. During the final molding operation by roller 94, the outer cylinder is subjected to flames from two pairs of burners 152 and 153, which are similar in arrangement to burners 150 and 151, except that the flames from burners 152 and 153 are spread more widely, so as to cover about 1½ inches on either side of the neck rim of the inner cylinder. The heat from burners 152 and 153 is such as to maintain the glass at the right degree of plasticity during the molding operation. After the glass has been shaped by roller 94, it is moved to a position where it comes under the intense heat of flames projected from two sets of burners 154 and 155, which are so arranged as to concentrate sharp flames of intense heat opposite the flaring rim 68 of the inner cylinder X. The pressure of these flames is such that it forces the outer glass inwardly against the flaring rim 68, so that the two cylinders are fused together to form an annular seal, as indicated at 156 in Fig. 12. The surplus glass 157 on the outer cylinder below the sealing joint 156 is automatically removed by suddenly dropping the cam-track 75 after the sealing of the joint has been accomplished. The glass below the seal is so hot and soft that it drops down the moment when the cup 62 descends. The final step in the operation is the smoothing of the sealed joint by flames directed from burners 158 and 159, as shown in Figs. 1 and 7. Three upper burners 158 throw the flames horizontally against the edge 160 of the sealed joint, and three lower burners 159 are so arranged as to direct flames against the underside of sealing edge 160. As may be seen from Fig. 1, the flames from burners 158 and 159 converge beneath the sealing edge 160 and melt the glass sufficiently to form a substantially smooth even joint all around.

The operation of the machine will be fully understood from the preceding description, but I think it will be helpful if we follow the movements of the glass units from one position to the next in the various steps from the loading of the separate cylinders until the removal of the sealed unit. The operator standing in front of the machine loads a pair of inner and outer cylinders in position A, as indicated in Figs. 1 and 7. At this time the frame 2 is standing still, and there is no rotary movement of the rod and chuck on which the two cylinders are mounted in their initial positon. This is due to the fact that the associated gear 58 is not in contact with any one of the rotating friction wheels 76. As previously explained, the stationary periods of frame 2 last each twenty seconds. During the first movement of frame 2, after the loading of the cylinders, the latter are carried from position A to position B, where the outer cylinder is subjected to heat from gas jet 147. During this preliminary heating, the cylinders are rotated as a unit, so that the heating is uniform all around the cylinder. In fact, as will be seen from the plan view of Fig. 10, the cylinders are rotated during the stationary periods of the frame, because then the gears 58 are in driving contact with the rubber wheels 76. The only chuck that is not operated when the frame stands still is the one in position A, as previously mentioned. After being heated for twenty seconds in position B, the cylinders are moved to position C, where the heat is increased for further softening of the glass. Just before the cylinders leave this position, the glass starts to turn a dull red and becomes plastic. During the movement of the cylinders from position C to position D, the shaping roller 93 is held out of the way because the arm 90 is in position 90'. As soon as the cylinders reach position D, the cam 111 causes the arm 90 to swing inwardly so as to bring the roller 93 into shaping contact with the plastic glass of the outer cylinder. It will be noticed by reference to Fig. 2 that, during the travel of the cylinders from position C to D, the pin 59 rides up on cam-track 72 until the cup 62 is raised into supporting contact with the bottom edge of the outer cylinder. Therefore, during the molding action of roller 93, the weight of the cylinder below the shaping zone is supported to prevent thinning of the plastic glass. After twenty seconds of this preliminary shaping operation, the cylinders are moved to position E, where the final shaping is accomplished by roller 94, as shown in Fig. 11. During this final shaping operation, the cup 62 supports the bottom of the outer cylinder for reasons previously explained. The cylinders now move to position F, where the intense heat and inward pressure of the sharp flames from burners 154 and 155 forces the soft glass of the outer cylinder into sealing contact with the outwardly flaring neck of the inner cylinder, as illustrated in Fig. 12. The sealing flames are so intense that the surplus glass is cut off just before the twenty-second period is up. At that moment the cam-track 75 drops and the cup 62 suddenly descends, carrying with it the surplus glass from below the sealed joint. During the sealing operation the cup remains in supporting contact with the bottom of the outer cylinder, so that the soft glass will not be thinned out at the sealing joint. In fact, the cup 62 might be slightly raised at that moment to increase the thickness of the glass at the joint. By regulating the upward movement of the cup, it is possible to regulate the thickness of the glass at the sealing joint. When the sealed unit moves from position F to position G, the pin 59 leaves the lowered cam-track 75 and drops to the table. When the sealed unit is in position G, the previously formed seal is made smooth and even by the converging flames from burners 158 and 159. During this final smoothing operation, air under slight pressure is admitted into the annular chamber 70 between the cylinders through the hole 71 in the base of the outer cylinder. The purpose of admitting air under pressure between the cylinders is to prevent collapse or deformation of the glass at the sealed joint by the intense heat to which the glass is subjected. In other words, the inward pressure of the converging flames from burners 158 and 159 is balanced by the outward pressure of the air in chamber 70. Any practical arrangement may be used for injecting compressed air or other gaseous medium into chamber 70. In the drawings I have simply shown a nozzle 161 connected with a source of air or other gaseous medium under pressure. While this final smoothing takes place, the operator knocks off the surplus glass from cup 62. This is quickly and easily done by simply striking the glass with a rod. When the completed unit reaches position A, the operator removes it and loads the chuck mechanism with new stock. It will be seen that the position marked A is both the loading and the unloading point. The operator has twenty seconds for the unloading and loading operations, and it has been found in actual practice that his brief interval is sufficient for that purpose. In the particular embodiment set forth, the time elapsing between the loading of a pair of cylinders and the removal of the sealed unit is about 140 seconds. Since the present machine operates on seven pairs of cylinders at the same time, a sealed unit is taken out every twenty seconds. The capacity of the machine may obviously be increased.

The hole 71 in the base of the inverted outer cylinder is not only for the injection of air during the final seal-smoothing operation, but it also allows the escape of hot air from the annular space 70 between the cylinders during the heating stages. A further function of air hole 71 is to act as a connection with the exhausting apparatus in the subsequent operation of evacuating the chamber 70.

The method and apparatus herein set forth can also be used for sealing glass cylinders having no contracted neck. In the so-called insulated food jars, the glass filler or container has a wide open mouth and the two cylinders of which it consists are each of substantially uniform diameter. In sealing such cylinders in inverted position at the neck, the shaping rollers 93 and 94 are not used. Also in sealing these wide-mouthed fillers, the outer cylinder need not be longer than the inner cylinder, but is preferably of the same length, so that no removal of surplus glass is necesary.

Although I have shown and described a specific construction, I want it understood that my invention is not limited to the structural details set forth, for it is obvious that changes and modifications may be made without departing from the scope of the invention as defined in the following claims.

I claim as my invention:

1. In a machine for producing double-walled glass containers, means for supporting an inner and an outer cylinder in inverted position and in concentric spaced relation, driving connections for rotating the two cylinders as a unit about their common vertical axis, means for heating the rotating outer cylinder until the same is fused to the lower edge of the inner cylinder in a sealed annular joint, and properly timed mechanism for suddenly and positively removing the surplus glass from below said joint.

2. In apparatus for uniting two glass cylinders at the neck to form a double-walled container, means for supporting the cylinders in inverted position and in concentric spaced relation, the inner cylinder having a neck and the outer cylinder extending below said neck, means for heating an annular zone of said outer cylinder until the glass is plastic, a member for shaping said plastic portion of the outer cylinder into conformity with the neck of the inner cylinder, separate means for applying heat to the neck-shaped portion of the outer cylinder until the two necks are fused together in a sealed joint, and properly timed mechanism for suddenly carrying the surplus glass away from the outer cylinder below said sealed joint.

3. In apparatus for uniting two glass cylinders at the neck to form a double-walled container, means for supporting the cylinders in inverted position and in concentric spaced relation, the inner cylinder having a neck and the outer cylinder extending below said neck, means for heating an annular zone of said outer cylinder until the glass is plastic, a member for shaping said plastic portion of the outer cylinder into conformity with the neck of the inner cylinder, separate means for applying heat to the neck-shaped portion of the outer cylinder until the two necks are fused together in a sealed joint, properly timed mechanism for suddenly carrying the surplus glass away from the outer cylinder below said sealed joint, and means for applying sharp flame jets upwardly against the lower edge of said sealed joint to render the same practically smooth and even.

4. In a machine for producing double-walled glass containers, a rod for supporting an inner cylinder in inverted position, a disk supported concentrically with respect to said rod and adapted to engage the lower end of an outer cylinder for holding the same inverted over the inner cylinder in concentric spaced relation, and means for moving said disk vertically at predetermined intervals.

5. In a machine of the class described, a rod for supporting a glass cylinder in inverted position, the upper or base part of the cylinder being adapted to rest on the inner end of said rod, and a perforated member fixed on said rod in position to engage the neck of the inverted cylinder and thereby hold the latter against side movement, the holes in said member providing air vents.

6. In a machine for producing double-walled glass containers, a rod for supporting an inner cylinder in inverted position, a member arranged to engage the lower end of an outer cylinder to hold the same inverted over the inner cylinder in concentric spaced relation, and driving connections for rotating said rod and member at the same speed so that said cylinders rotate as a unit.

7. In a machine for producing double-walled glass containers, means for supporting an inner cylinder in inverted position, separate means for concentrically supporting an outer cylinder in inverted position over said inner cylinder, driving connections leading to both of said supporting means for rotating the cylinders as a unit about their common axis during the various operations hereinafter mentioned, a plurality of heating devices arranged at suitable intervals, mechanism for periodically moving said cylinders into the successive heat zones of said devices for gradually heating the neck portion of the outer cylinder to a plastic condition, a shaping member adjacent the last of said heating devices for shaping the plastic portion of the outer cylinder into conformity with the neck of the inner cylinder, and heating means spaced from said shaping member for applying sharp flames to the neck joint of said cylinders, whereby said neck joint is sealed, said mechanism automatically moving said cylinders into operative relation to said shaping member and said sealing means.

8. In apparatus for producing double-walled glass containers, means for supporting a pair of cylinders in inverted position and in concentrically spaced relation, means for applying heat to the outer cylinder until the same is fused to the neck of the inner cylinder in a sealed annular joint, a vertically movable member for supporting the bottom of the outer cylinder during the sealing operation, and means for suddenly dropping said member to carry away the surplus glass instantly from the outer cylinder and thereby leave a substantially even edge at the sealed joint.

9. In a machine for producing double-walled glass containers, means for supporting an inner cylinder in inverted position, means for supporting an inverted outer cylinder on said inner cylinder in concentrically spaced relation, groups of burners arranged in circularly spaced relation, timed connections for intermittently moving the inverted cylinders in a circular path from one group of burners to the next until the cylinders are united in a sealed joint at the neck, and means for rotating the inverted cylinders as a unit on their common axis during their successive heating operations.

10. In apparatus for producing double-walled glass containers, means for supporting an inner and an outer cylinder concentrically spaced in inverted position, the neck of the inner cylinder terminating in an outward flare, means for directing sharp flames of requisite heat and pressure in a circular zone to the outer cylinder so as to force the plastic glass into sealing contact with the flaring rim on the neck of the inner cylinder, whereby the two cylinders are united at the neck in a sealed joint, and timed mechanical means for quickly removing the surplus glass from the outer cylinder.

11. In apparatus for sealing an inner and an outer glass cylinder at the neck, means for supporting the cylinders in inverted position while applying flames to fuse the inverted cylinders together in a sealed joint at the neck, a series of burners so arranged as to direct flames horizontally against the sealed joint and simultaneously to direct other flames upwardly against the bottom edge of the sealed joint while the cylinders are still inverted, said horizontal and upward flames converging on the edge of said joint to render the same substantially smooth and even, and means for rotating the inverted cylinders during said finishing operation.

12. In apparatus for producing double-walled glass containers, means for supporting an inner and an outer cylinder in inverted position, said cylinders being held in concentrically spaced relation, means for applying heat to seal said cylinders together at the neck while supported in inverted position, mechanical means for suddenly removing the surplus glass from the outer cylinder, a plurality of burners so arranged as to direct flames upwardly against the bottom edge of said sealed joint while the cylinders are still inverted, whereby the edge of said joint is rendered substantially smooth and even, and means for introducing air pressure into the annular space between the inverted cylinders during said smoothing operation.

13. In a machine for uniting two glass cylinders at the neck to form a double-walled container, means for supporting an inner cylinder in inverted position, a vertically movable member for supporting an outer cylinder in inverted position over the inner cylinder, said member engaging the lower end of the outer cylinder, means for heating the inverted cylinders to unite them in a sealed joint at the neck, and means for suddenly lowering said supporting member to remove the lower section of the outer cylinder from below the sealed joint at the neck.

14. Apparatus for producing double-walled glass containers comprising means for supporting an inner cylinder in inverted position, means for supporting an outer cylinder in inverted position over said inner cylinder and holding the two cylinders in concentrically spaced relation, means for heating an annular lower portion of said outer cylinder until the glass is sufficiently plastic, shaping mechanism arranged to engage said plastic portion of the outer cylinder to shape the same into conformity with the neck of the inner cylinder, means for applying flame jets to the neck-shaped portion of the outer cylinder until the two necks are fused together in a sealed annular joint, a vertically movable member arranged to engage the lower end of the outer cylinder for temporarily supporting the surplus glass during the fusing operation, and means for suddenly dropping said supporting member to remove the surplus glass from below the sealed joint.

15. Apparatus for producing double-walled glass containers comprising means for supporting an inner cylinder in inverted position, means for supporting an outer cylinder in inverted position over said inner cylinder and holding the two cylinders in concentrically spaced relation, means for heating an annular lower portion of said outer cylinder until the glass is sufficiently plastic, shaping mechanism arranged to engage said plastic portion of the outer cylinder to shape the same into conformity with the neck of the inner cylinder, means for applying flame jets to the neck-shaped portion of the outer cylinder until the two necks are fused together in a sealed annular joint, a vertically movable member arranged to engage the lower end of the outer cylinder for temporarily supporting the surplus glass during the fusing operation, means for suddenly dropping said supporting member to remove the surplus glass from below the sealed joint, means for applying properly directed flame jets to smooth said sealed joint, and means for subjecting the annular space between the two cylinders to gaseous pressure during said smoothing operation.

16. Apparatus for producing double-walled glass containers comprising the combination of a vertical rod for supporting an inner cylinder in inverted position, said cylinder having a contracted neck, means for supporting an outer cylinder in concentrically spaced relation over said inner cylinder, means for heating an annular lower portion of the outer cylinder until the glass is sufficiently plastic, shaping mechanism arranged to engage said plastic portion of the outer cylinder to shape the same into conformity with the neck of the inner cylinder, a plurality of burners so arranged as to direct sharp flames of requisite heat and pressure in a circular zone to the neck-shaped portion of the outer cylinder, whereby said neck-shaped portion is forced into sealing contact with the neck of the inner cylinder, the sharp flames from said burners at the same time cutting off the surplus glass from the outer cylinder below the sealed joint, a vertically movable member for supporting the lower end of the outer cylinder during the shaping and neck-sealing operations, means for suddenly dropping said member to remove the surplus glass from the sealed joint, a plurality of burners so arranged as to direct flames against said sealed joint to smooth the same while the two cylinders are still held in inverted position, and means for subjecting the annular space between the cylinders to gaseous pressure during said smoothing operation.

17. In apparatus for producing double-walled glass containers, means for supporting an inner and an outer cylinder concentrically spaced in inverted position, means for rotating the inverted cylinders as a unit about their common vertical axis, means for heating an annular portion of the outer cylinder into plastic condition, a shaping roller arranged to engage the plastic portion of the outer cylinder for partially shaping the same, a second shaping roller arranged to engage the outer cylinder for imparting a final shape thereto, means for sealing the finally shaped outer cylinder to the neck of the inner cylinder, and means for intermittently moving said unit in a circular path from one position to the next in the aforesaid operations of heating, shaping and sealing.

18. In apparatus for producing double-walled glass containers, the combination of a vertical rod adapted to support an inner cylinder in inverted position, means carried by said rod to engage the lower end or neck of said cylinder and thereby hold the latter against side movement, a chuck arranged to hold an inverted outer cylinder concentrically over the inner cylinder, means for simultaneously rotating said rod and chuck at the same speed, whereby the inner and outer cylinders rotate as a unit about their common vertical axis, and means for applying heat to the outer cylinder until the same is fused to the lower end of the inner cylinder, the two cylinders being rotated during the fusing operation so as to form a sealed annular joint at the neck.

19. In apparatus of the class described, the combination of a vertical rod for supporting an inner glass cylinder in inverted position, means on said rod to prevent lateral movement of the inverted cylinder, a chuck arranged to grip an inverted outer cylinder and hold the same concentrically over the inner cylinder, means for simultaneously rotating said rod and chuck at the same speed, whereby the two cylinders rotate as a unit about their common vertical axis, means for applying heat to seal the rotating cylinders together at the neck, a vertically movable member mounted concentrically with said rod below the cylinders, means for raising said member into supporting contact with the bottom of the outer cylinder during the sealing operation, and means for suddenly dropping said member at a predetermined moment to remove the surplus glass from the outer cylinder.

20. In apparatus of the class described, the combination of a vertical rod for supporting an inner glass cylinder in inverted position, means on said rod to prevent lateral movement of the inverted cylinder, a chuck arranged to grip an inverted outer cylinder for holding the same concentrically over the inner cylinder, means for simultaneously rotating said rod and chuck at the same speed, whereby the two cylinders rotate as a unit about their common vertical axis, means for applying heat to seal the rotating cylinders together at the neck, a vertically slidable pin mounted concentrically with said rod below the same, a disk-shaped member centrally mounted on said pin and movable therewith, a cam engaging said pin to raise said member into supporting contact with the bottom of the outer cylinder during the sealing operation, and means for causing said pin and disk to drop at a predetermined moment to remove the surplus glass from the outer cylinder.

21. In the manufacture of double-walled glass containers, the improvement which consists in supporting an inner cylinder in inverted position and supporting an inverted outer cylinder on the inner cylinder by means of heat-insulated pads fastened to the rounded base of the inner cylinder, so that the rounded base of the inverted outer cylinder rests directly on said pads and is supported thereby.

22. In a machine for sealing pairs of concentric glass cylinders at the neck to produce double-walled containers, means for supporting an inner cylinder in inverted position, and means for supporting an inverted outer cylinder in concentric relation on said inner cylinder, said last-named supporting means comprising heat-insulated pads secured to the rounded base of the inner cylinder and from which the outer cylinder is suspended.

23. In a machine for producing double-walled glass containers, a vertical rod for supporting an inner cylinder in inverted position, the upper rounded part of said cylinder being provided with heat-insulated pads adapted to support an outer cylinder over the inner cylinder, and means cooperating with said supporting pads for holding the outer cylinder in permanent concentric relation to the inner cylinder.

24. In apparatus for producing double-walled glass containers, a vertical rod for supporting an inner cylinder in inverted position, heat-insulated pads secured to the upper rounded portion of said cylinder and adapted to support an inverted outer cylinder in concentric spaced relation to the inner cylinder, means independent of said pads for holding the outer cylinder in said concentric relation, and means for applying heat to the outer cylinder until it is fused to the neck of the inner cylinder in a sealed joint.

25. In apparatus of the class described, the combination of a vertical rod for supporting an inner glass cylinder in inverted position, means on said rod to prevent lateral movement of the inverted cylinder, the upper portion of said inner cylinder being provided with pads for supporting an inverted outer cylinder over the inner cylinder, said pads holding the outer cylinder spaced from the inner cylinder, a chuck arranged to grip the outer cylinder for holding the same in concentrically spaced relation to the inner cylinder, and means for simultaneously rotating said rod and chuck at the same speed, whereby the two cylinders rotate as a unit about their common vertical axis.

26. A machine for producing double-walled glass containers comprising a horizontally rotatable frame having means to support a plurality of glass units in spaced circular relation, each unit consisting of an inner and an outer cylinder in inverted position and concentrically spaced, means for shaping the outer cylinder of each unit, driving connections for automatically moving said shaping means into and out of contact with the outer cylinders at predetermined intervals, means for applying heat to the shaped cylinder to unite the same to the neck of the inner cylinder in a sealed joint, positively actuated means for removing the surplus glass from the sealed joint connections for automatically operating said last mentioned means at predetermined intervals, and driving connections for turning said frame intermittently so as to move said units from one position to the next during the aforesaid operations.

27. In apparatus for producing double-walled glass containers, a rod for supporting an inner cylinder in inverted position, a chuck for holding an inverted outer cylinder concentrically over said inner cylinder, there being spacing means between said cylinders, means for simultaneously rotating said rod and chuck at the same speed so that the two cylinders rotate as a unit about their common vertical axis, means for heating the outer cylinder in a circular zone to make the glass plastic, a device movable into contact with the plastic portion of the outer cylinder for shaping the same into conformity with the neck of the inner cylinder, a plurality of burners arranged to heat the neck-shaped portions of the outer cylinder until it is fused with the neck of the inner cylinder in a sealed joint, a horizontally rotary support on which said rod and chuck are mounted, and means for periodically turning said support to carry the inverted cylinders from one position to another for the heating, shaping and sealing operations.

28. Apparatus for producing double-walled glass containers, comprising a horizontally rotatable frame, a plurality of circularly spaced supporting devices on said frame for supporting a plurality of inner and outer cylinders in inverted position, each inner cylinder being surrounded by an outer cylinder in concentrically spaced relation, means for simultaneously rotating said supporting devices to rotate each pair of inner and outer cylinders as a unit about their common vertical axis, means for heating the outer cylinder of each unit in an annular region until the glass is plastic, a roller for shaping said plastic portion of the outer cylinder into conformity with the neck of the inner cylinder, burners arranged to heat the neck-shaped portion of the outer cylinder until the same is fused to the neck of the inner cylinder in a sealed annular joint, positively actuated means for removing the surplus glass from below the sealed joint, connections for automatically operating said last mentioned means at predetermined intervals, and driving connections for intermittently turning said frame to move the pairs of inverted cylinders from one position to the next in a circular path during said heating, shaping and sealing operations.

29. In apparatus for producing double-walled glass containers, the combination of a vertical rod adapted to support an inner cylinder in inverted position, the upper portion of said inner cylinder being provided with heat-insulated pads, means on said rod to engage the lower end or neck of said cylinder and thereby hold the latter against side movement, said pads being adapted to support an outer cylinder in inverted position on the inner cylinder, a chuck engaging the upper portion of the outer cylinder to hold the same in concentric relation to the inner cylinder, means for heating the outer cylinder in an annular region opposite the neck of the inner cylinder until the glass is plastic, a roller for shaping said plastic portion of the outer cylinder into conformity with the neck of the inner cylinder, means for moving said roller into and out of contact with the outer cylinder, a series of burners arranged to heat the neck-shaped portion of the outer cylinder until the same is fused to the neck of the inner cylinder, whereby the two cylinders are united at the neck in a sealed joint, means for simultaneously rotating said rod and chuck at the same speed so that the two cylinders rotate as a unit about their common vertical axis during the heating, shaping and fusing operations, a vertically movable cup arranged concentrically with said cylinders to support the bottom of the outer cylinder during the shaping and sealing operation, means for rotating said cup at the same speed as said cylinders, and means for suddenly dropping said cup to carry away the surplus glass from the outer cylinder below the sealed joint.

30. Apparatus for producing double-walled glass containers comprising a horizontally rotatable frame, a series of vertical rods mounted on said frame in spaced circular relation, each of said rods being adapted to support an inner cylinder in inverted position, a corresponding series of chucks mounted on said frame in concentric relation to said rods, each chuck being adapted to hold an inverted outer cylinder concentric with the inner cylinder supported on the associated rod, means for rotating said chucks and rods at the same speed so that each pair of inner and outer cylinders rotates as a unit, a series of vertical pins mounted on said frame below said rods and in axial alignment therewith, said pins being vertically movable independently of each other and rotatable about their axes in unison with said rods and chucks, a disk fixed on the upper end of each pin in concentric relation to the outer cylinder above the disk, driving connections for intermittently turning said horizontal supporting frame so as to move said units from one position to the next in the operations hereinafter set forth, a cam track on said frame arranged to be engaged by said pins for lifting the proper disks into supporting contact with the bottom of the associated outer cylinder at a predetermined moment in the travel of said units, the terminal section of said cam track being vertically adjustable, a shaping roller mounted on a movable arm normally out of the path of travel of said units, means for moving said roller into shaping contact with an outer cylinder, means for heating an annular portion of the outer cylinders into plastic condition before the units are moved into position for shaping by said roller, a series of burners arranged to direct sharp flames against the shaped portion of the outer cylinder until the latter is fused to the neck of the inner cylinder in a sealed joint, the bottom of the outer cylinder being supported by the associated disk during the shaping and sealing operations, means for suddenly dropping said adjustable section of the cam track at a predetermined moment during the sealing operation, so that the disk supporting the bottom of the outer cylinder drops instantly to carry away the surplus glass from below the sealed joint, and a second series of burners arranged to direct flames underneath said sealed joint to make a substantially smooth even seal.

MINER P. WETMORE.